United States Patent
Votipka et al.

(10) Patent No.: US 6,842,265 B1
(45) Date of Patent: Jan. 11, 2005

(54) METHOD AND APPARATUS FOR CONTROLLING IMAGE ORIENTATION OF SCANNER APPARATUS

(75) Inventors: Bruce Votipka, Fort Collins, CO (US); Virgil Russon, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 606 days.

(21) Appl. No.: 09/675,514

(22) Filed: Sep. 29, 2000

(51) Int. Cl.⁷ .............................. G06K 1/00; G06K 9/32; G06K 9/46; H04N 1/04
(52) U.S. Cl. ...................... 358/1.16; 358/1.6; 358/358; 358/474; 382/296; 382/237
(58) Field of Search ................... 358/1.16, 1.6, 358/474, 1.13; 382/296, 237

(56) References Cited

U.S. PATENT DOCUMENTS 5,133,025 A * 7/1992 Koyama et al. ............ 382/296
5,761,344 A * 6/1998 Al-Hussein ................. 382/237
6,118,546 A * 9/2000 Sanchez et al. .............. 358/1.6
6,559,967 B1 * 5/2003 Akiba et al. ............... 358/1.16

FOREIGN PATENT DOCUMENTS

EP 0886 434 A1 12/1998

* cited by examiner

*Primary Examiner*—Edward Coles
*Assistant Examiner*—Houshang Safaipour

(57) ABSTRACT

Image display orientation control apparatus for use with scanner apparatus and display apparatus operatively associated with the scanner apparatus may comprise a first setting and a second setting. The first setting causes an image of an object scanned by the scanner apparatus to be displayed on the display apparatus in a first orientation. The first setting is preserved for subsequent uses of the scanner apparatus until changed by a user. The second setting causes the image to be displayed on the display apparatus in a second orientation. The second setting is preserved for subsequent uses of the scanner apparatus until changed by the user.

20 Claims, 6 Drawing Sheets

METHOD AND APPARATUS FOR CONTROLLING IMAGE ORIENTATION OF SCANNER APPARATUS

FIELD OF INVENTION

This invention relates to scanner devices in general and more specifically to a method and apparatus for controlling the scan orientations of scanner devices.

BACKGROUND

Scanner devices, such as a flatbed scanner 3, are well-known in the art and produce machine-readable image data signals that are representative of a scanned object 5, such as a photograph or a page of printed text. See FIG. 1. In a typical scanner application, the image data signals produced by a flat bed scanner 3 may be used by a computer system 7 to reproduce an image 9 of the scanned object 5 on a suitable display device 11, such as a cathode ray tube ("CRT") or liquid crystal display ("LCD"). The computer system 7 may also print an image (not shown) of the object 5 on a printer (also not shown) connected to the computer system 7.

The typical flatbed scanner 3 is provided with a scanner housing 13 suitable for holding the various systems and components comprising the flatbed scanner 3. See FIG. 1. The scanner housing 13 may comprise a generally rectangularly shaped structure having a top side 15 and a bottom side 17 that are positioned in generally parallel, spaced-apart relation to one another. The top side 15 of scanner housing 13 may include a generally rectangularly shaped scanning bed or transparent platen 19 that has a length 25 and a width 27. Generally, the width 27 is less than the length 25. The scanning bed 19 may have first and second edges 33 and 35 that are positioned in generally parallel, spaced-apart relation to one another. The scanning bed 19 may also include third and fourth edges 37 and 39 that are positioned in generally parallel, spaced-apart relation to one another.

The scanner housing 13 may be further provided with a control panel 21 operatively associated with the flatbed scanner 3. A scanner lid 23 may be pivotally attached to the housing 13 via a hinge member 29. The hinge member 29 allows the scanner lid 23 to rotate about a pivot axis 31 between its opened position and its closed position.

The flatbed scanner 3 may further include illumination and optical systems (not shown) positioned within the housing 13 underneath the scanning bed 19. The illumination and optical systems accomplish the scanning of the object 5. More specifically, the illumination system illuminates a portion of the object 5 (commonly referred to as a "scan region"), whereas the optical system collects light reflected by the illuminated scan region and focuses a small area of the illuminated scan region (commonly referred to as a "scan line") onto the surface of a photosensitive detector (not shown) positioned within the scanner housing 13. Image data representative of the entire object 5 may then be obtained by sweeping the scan line across the entire object 5, usually by moving the illumination and optical systems with respect to the object 5.

By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" (CIS) may be used to collect and focus light from the illuminated scan region on the detector. The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

Flatbed scanners and the various components thereof are disclosed in U.S. Pat. No. 6,040,572 for NOTEBOOK STYLED SCANNER of Khovaylo, et al.; U.S. Pat. No. 4,926,05 for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; U.S. Pat. No. 4,870,268 for COLOR COMBINER AND SEPARATOR AND IMPLEMENTATIONS of Kent J. Vincent and Hans D. Neuman; U.S. Pat. No. 5,038,028 for OPTICAL SCANNER APERTURE AND LIGHT SOURCE ASSEMBLY of Boyd, et al.; and U.S. Pat. No. 5,227,620 for APPARATUS FOR ASSEMBLING COMPONENTS OF COLOR OPTICAL SCANNERS of Elder, et al., which are each hereby specifically incorporated by reference for all that is disclosed therein.

As personal computers and their peripheral devices continue to decrease in price while increasing in quality, more users find themselves with home computer systems that include scanners and high-quality color printers. Although many of the users have been informed of the ease with which creative tasks can be performed with such high-tech devices, many creative tasks can be far too complex for the average user to successfully complete and enjoy. For example, many problems surface when a user wants to scan an object that has a different orientation than the scanner (i.e., scanning a landscape-oriented item on a portrait-oriented flatbed scanner).

As previously mentioned, the typical flatbed scanner 3 will have a non-square, generally rectangular scanning bed 19 under which the illumination and optical systems operate while gathering image data representative of the entire object 5. Traditionally, the software and hardware associated with flatbed scanners assume an orientation fixed by the movement of the illumination and optical systems. For reasons of manufacturing effectiveness, the movement of the illumination and optical systems and thus the orientation for flatbed scanners is almost universally oriented in portrait mode.

In the portrait orientation, the subject matter of the printed page is such that the short sides of the page form the top and bottom of the page. Conversely, in the landscape orientation, the subject matter of the printed page is such that the long sides of the page form the top and bottom of the page. Thus, an object 5 being scanned by a portrait-oriented flatbed scanner 3 should be oriented in an upright fashion in the direction indicated by arrow 43, that direction being substantially parallel to the length 25 of scanning bed 19 (FIG. 1). Stated differently, the portrait-oriented scanner 3 assumes that the top portion of the object 5 is located at about the first edge 33 of scanning bed 19. Since the typical flatbed scanner has a portrait orientation, users wanting to scan landscape-oriented objects (i.e., object 5' shown in FIG. 3) often obtain unsatisfactory results due to the mismatched orientations. To compensate for the different orientation, the image of the scanned landscape-oriented object 5' must first be rotated before it can be displayed in the proper orientation.

Partly in an effort to allow users to scan landscape-oriented objects with portrait-oriented scanners, computer software programs have been developed that allow users to rotate the images after scanning. While such software programs are effective from a functional standpoint, such software programs are not without their problems. For example, the additional steps required to rotate the images often leads to user confusion. Moreover, such software programs do not allow for the desired scanner orientation to be preserved for subsequent scans. Such an arrangement forces the user to rotate each image on a per-scan basis to correct for the portrait/landscape orientation mismatch. In other words, even if a user wishes to scan a series of landscape-oriented objects, the user is still required to scan each landscape-oriented object in portrait mode and then correct for the orientation mismatch by rotating each image separately. Although this "scan then rotate" procedure may eventually yield good results, it only does so after the user has expended significant amounts of time and effort to scan and then rotate each image. Obviously, such extensive computer-based editing requires a significant amount of time and patience on the part of the user and can quickly turn a creative endeavor into a tedious task.

In another effort to allow users to scan objects having orientations different from that of the scanner, computer software programs have been developed that automatically attempt to correct for the mismatched orientation (i.e., by rotating the image) when the software, after analyzing the scan content, determines it is necessary. Although such software programs may be functionally effective, they are fraught with problems. First, a substantial amount of time is needed for the software to analyze the scan content, to determine whether a orientation correction is needed, and then rotate the image. Second, the software may not always work if the object contains both landscape and portrait oriented features. Moreover, the automated software does not preserve the desired scanner orientation for subsequent scans. That is, the software rotates each image on a per-scan basis to correct for the portrait/landscape orientation mismatch. This "scan and automated rotation" procedure can only yield good results if a significant amount of time is available. Obviously, such extensive computer-based editing, even when performed automatically by the software, requires significant time and processing capacity.

Consequently, a need remains for image display orientation control apparatus that allows a user to select a scanning orientation (i.e., portrait or landscape) for a scanner and have that scanner orientation preserved for subsequent independent uses of the scanner. The image display orientation control apparatus should eliminate the need to individually rotate each scanned image when the objects being scanned have orientations that are different from that of the scanner. Finally, the image display orientation control apparatus should not prevent the user from using the traditional rotation tools available in the image processing software provided on the computer system 7 to override the selected scanner orientation.

SUMMARY OF THE INVENTION

Image display orientation control apparatus for use with scanner apparatus and display apparatus operatively associated with the scanner apparatus may comprise a first setting and a second setting. The first setting causes an image of an object scanned by the scanner apparatus to be displayed on the display apparatus in a first orientation. The first setting is preserved for subsequent uses of the scanner apparatus until changed by a user. The second setting causes the image to be displayed on the display apparatus in a second orientation. The second setting is preserved for subsequent uses of the scanner apparatus until changed by the user.

Also disclosed is a method for controlling image display orientation of display apparatus operatively associated with scanner apparatus that comprises the steps of: providing image display orientation control apparatus operatively associated with the scanner apparatus and the display apparatus, the image display orientation control apparatus operable in a first setting and a second setting, the first setting causing the display apparatus to display an image of an object scanned by the scanner apparatus in a first orientation, the second setting causing the display apparatus to display the image in a second orientation, the first and second settings of the image display orientation control apparatus being selectable by a user so that the first setting is preserved for subsequent uses of the scanner apparatus when the first setting is selected by the user and so that the second setting is preserved for subsequent uses of the scanner apparatus when the second setting is selected by the user; selecting the first setting so that the display apparatus displays the image in the first orientation; or, in the alternative, selecting the second setting so that the display apparatus displays the image in the second orientation; and operating the scanner apparatus.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
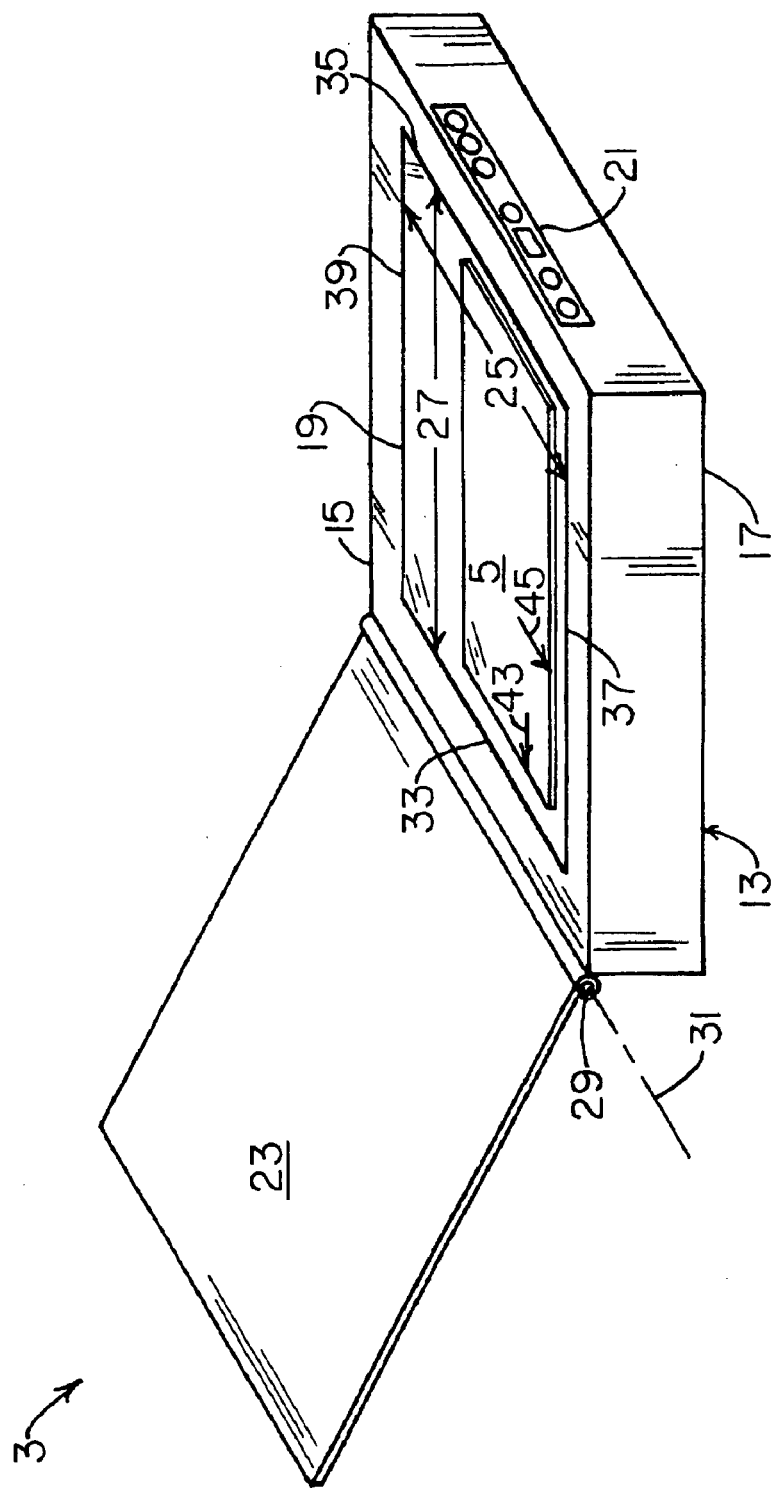
FIG. 1 is a perspective view of a flatbed scanner.
Figure 2:
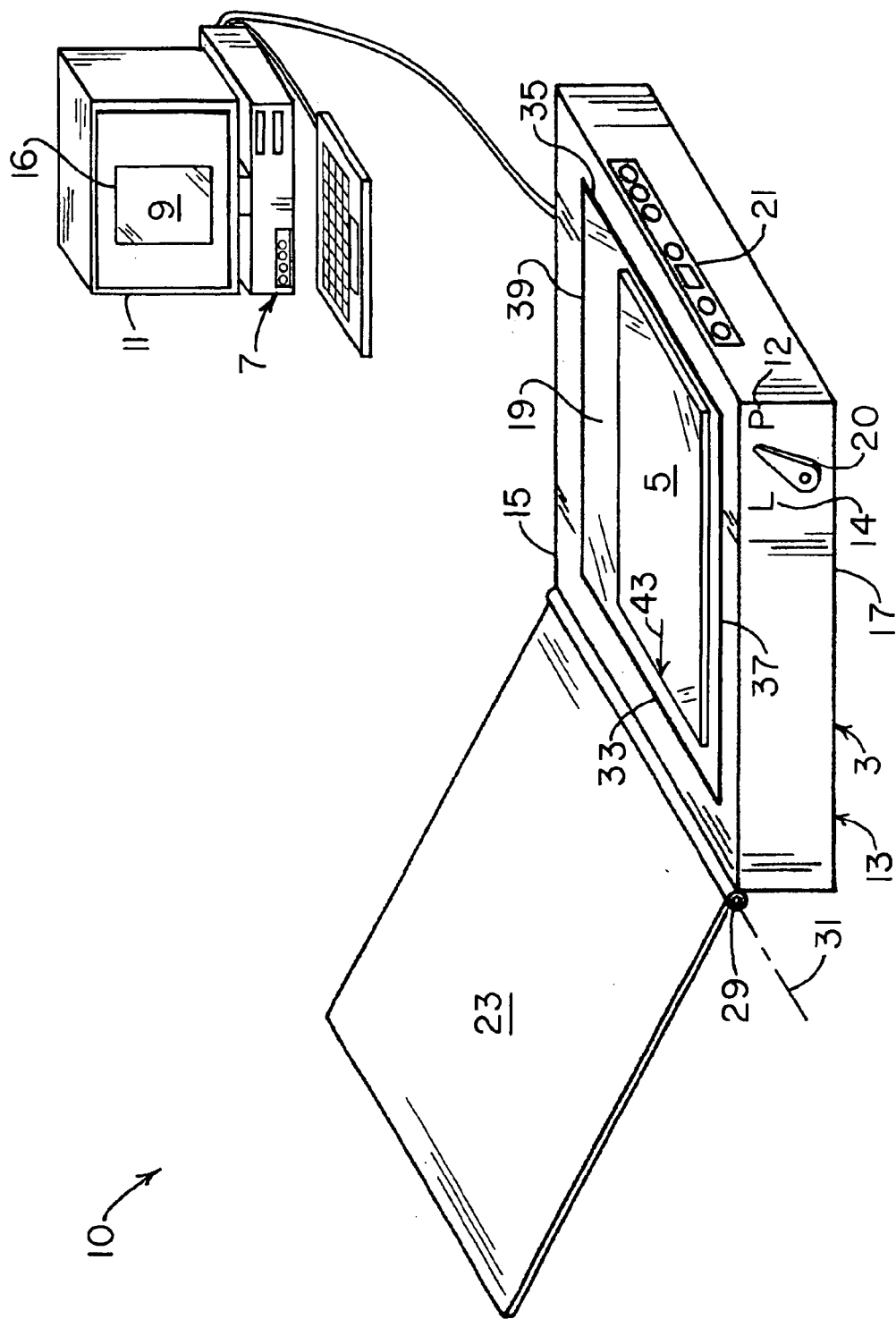
FIG. 2 is a perspective view of the image display orientation control apparatus according to one preferred embodiment of the present invention as it could be used with a flatbed scanner and host computer system.
Figure 3:
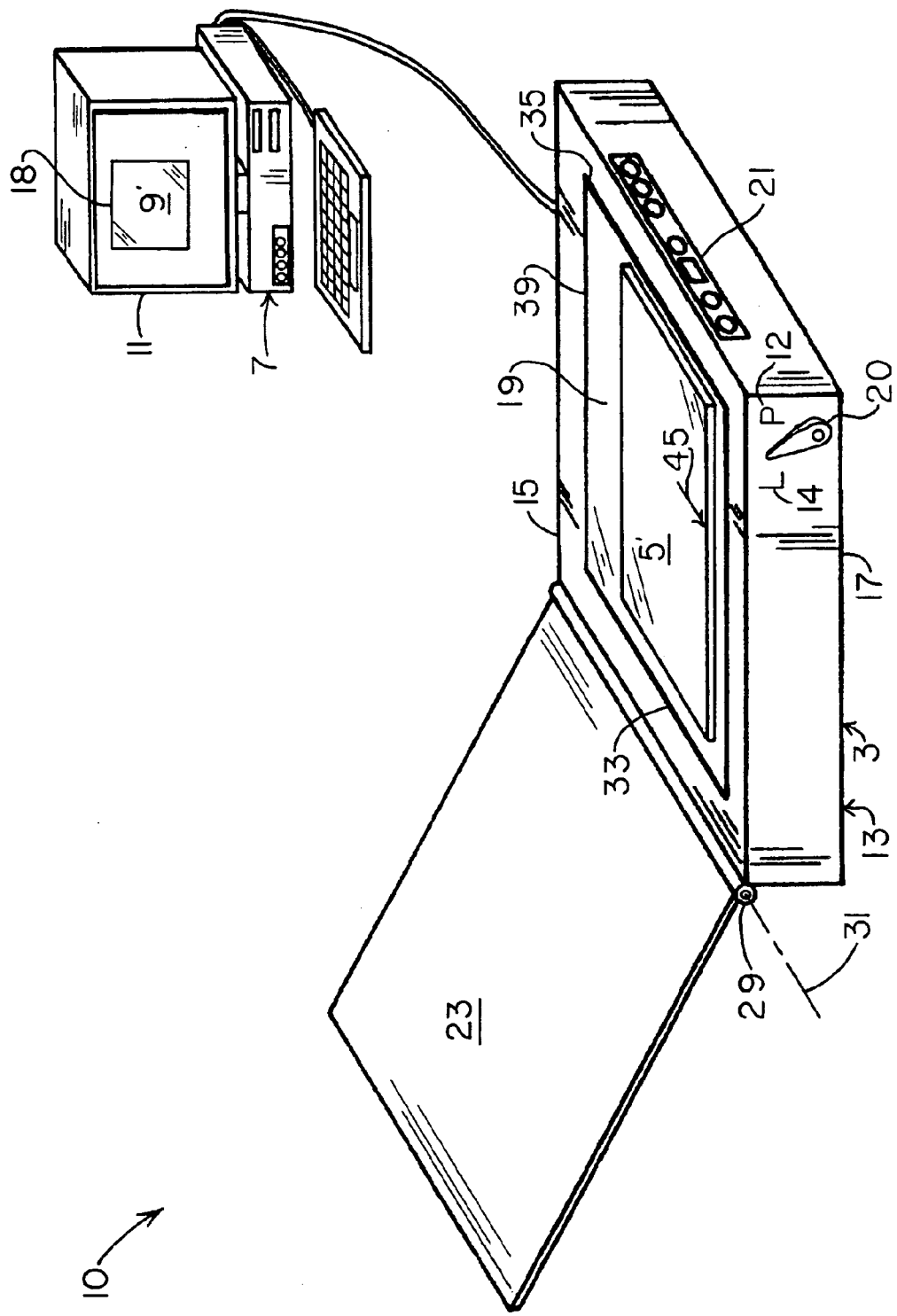
FIG. 3 is another perspective view of the image display control apparatus shown in FIG. 2 in a second or landscape orientation setting.

An image display orientation control apparatus 10 according to one preferred embodiment of the present invention is shown in FIGS. 2 and 3 and described herein as it could be used in conjunction with a flatbed scanner 3 connected to a host computer system 7. The host computer system 7 may display an image of the scanned object 5 or 5' on a suitable display device 11, such as CRT or LCD display. The computer system 7 may also print an image (not shown) of the scanned object 5 or 5' on a printer (not shown) that may be connected to the computer system 7. Alternatively, and as will be explained in greater detail below, the image display orientation control apparatus 10 may be used in conjunction with any of a wide range of other optical scanner apparatus and display apparatus.

The first embodiment of the image display orientation control apparatus 10 may comprise a switch 20 that may be switched between a first setting 12 (FIG. 2) and a second setting 14 (FIG. 3). The first setting 12 may cause an image 9 of an object 5 scanned by the flatbed scanner 3 to be displayed on the computer display screen 11 in a first orientation 16. In the embodiment shown and described herein, the first orientation 16 comprises a portrait orientation, although such is not required. The first setting 12 may be preserved for subsequent uses of the flatbed scanner 3 until a user (not shown) changes the setting. In other words, the first setting 12 of the image display orientation control apparatus 10 is preserved for subsequent uses of the flatbed scanner 3 when the first setting 12 is selected by the user.

The second setting 14 of the image display orientation control apparatus 10 may cause an image 9' of the object 5' to be displayed on the computer display screen 11 in a second orientation 18 (FIG. 3). In the embodiment shown and described herein, the second orientation 18 comprises a landscape orientation, although such is not required. Like the first setting 12, the second setting 14 may also be preserved for subsequent uses of the flatbed scanner 3 until changed by the user. Stated differently, the second setting 14 of the image display orientation control apparatus 10 is preserved for subsequent uses of the flatbed scanner 3 when the user selects the second setting 14.

Figure 4:
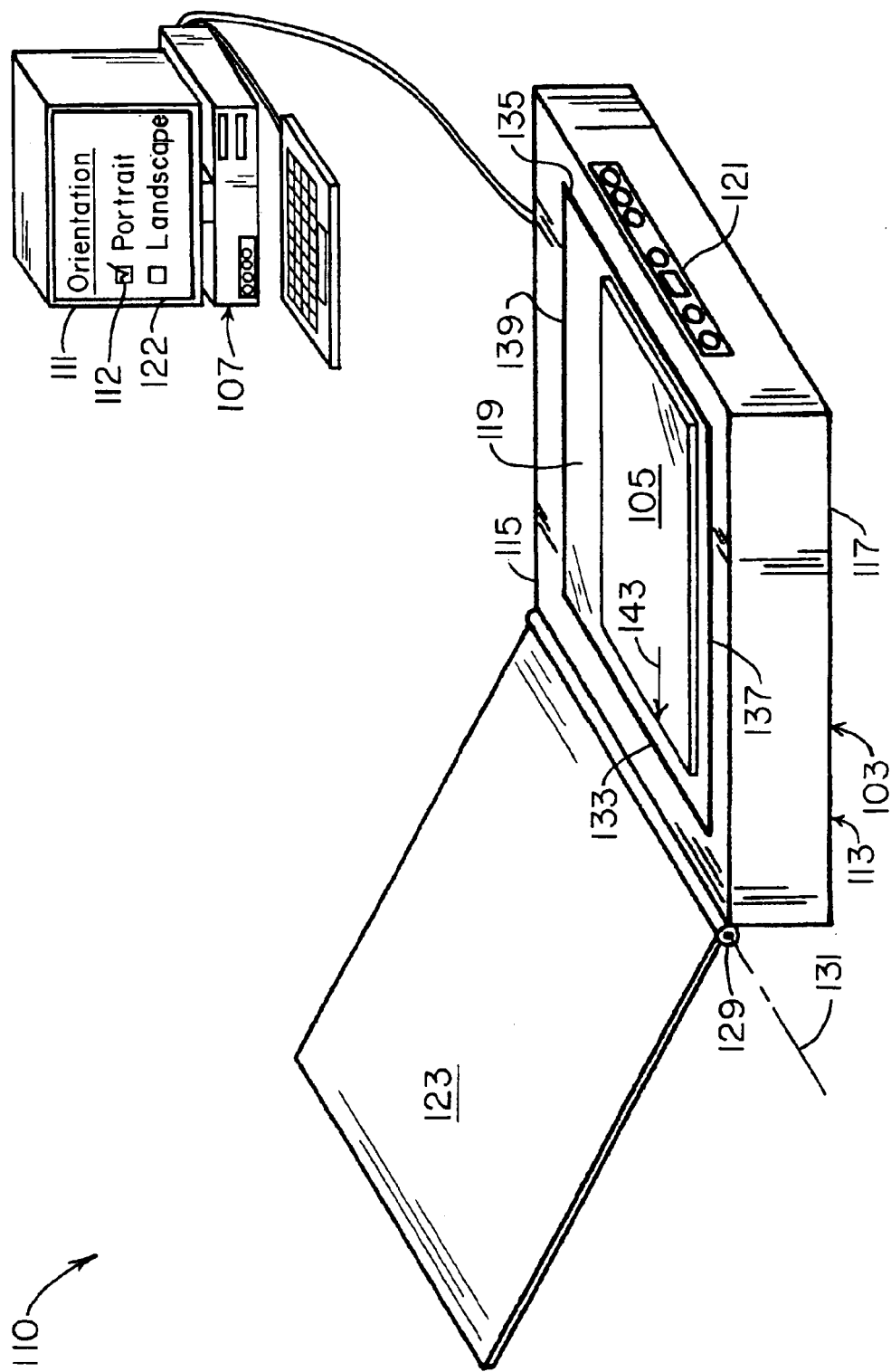
FIG. 4 is a perspective view of a second embodiment of the image display control apparatus in a first or portrait orientation setting.
Figure 5:
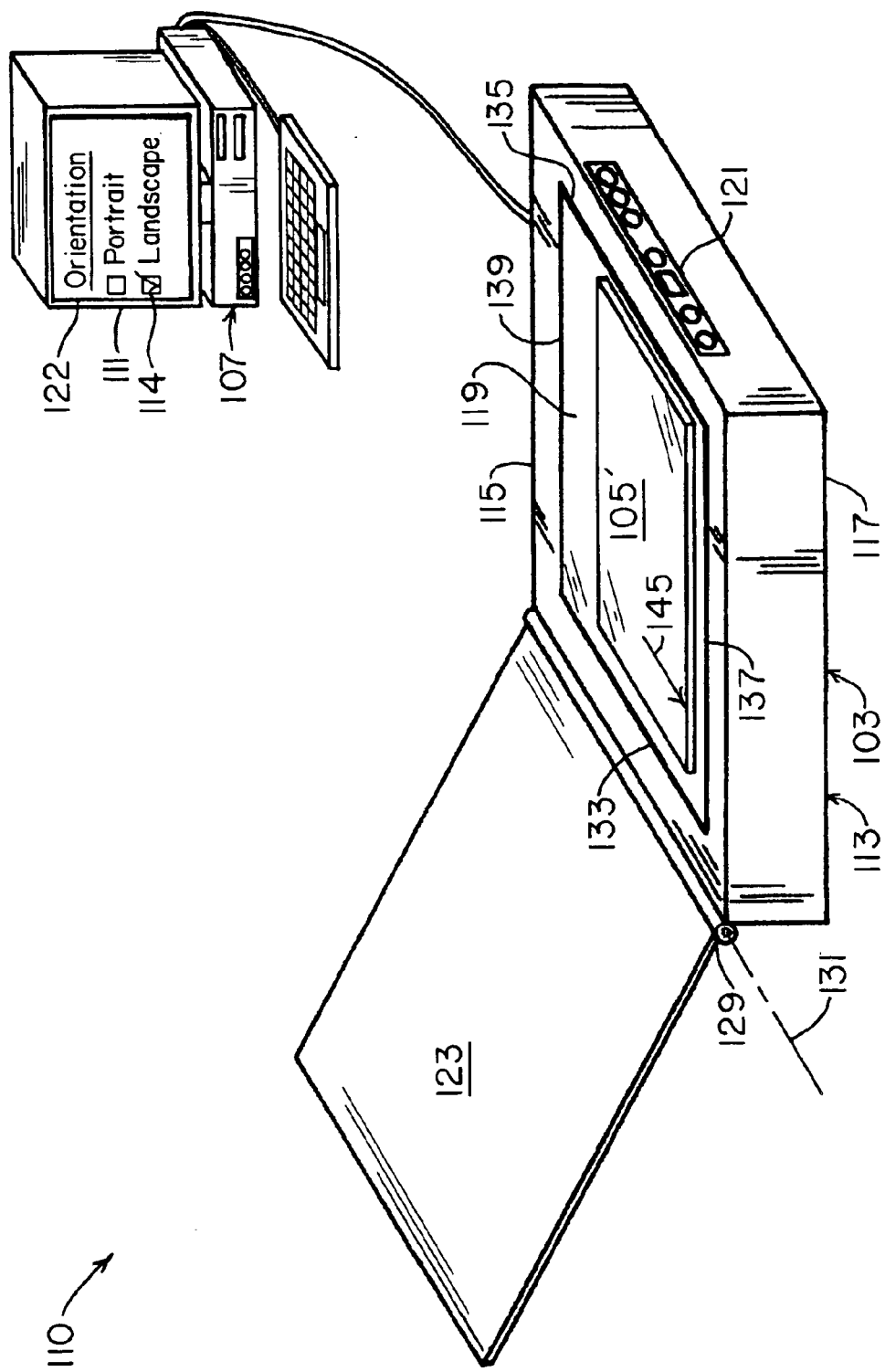
FIG. 5 is another perspective view of the second embodiment of the image display orientation control apparatus shown in FIG. 4 in a second or landscape orientation setting.

As discussed above, in one preferred embodiment of the image display orientation control apparatus 10, a switch 20 may be used to select between the first and second settings 12 and 14. The switch 20 may be mounted to the housing 13 of flatbed scanner 3 with the letters "P" and "L" identifying the portrait setting 12 and landscape setting 14, respectively. Alternatively, and as will be described in greater detail below, a switch 120 may be implemented as a user selectable interface 122 (e.g., icon or dialog box) that is displayed on the computer display screen 111, as seen in FIGS. 4 and 5.

Figure 6:
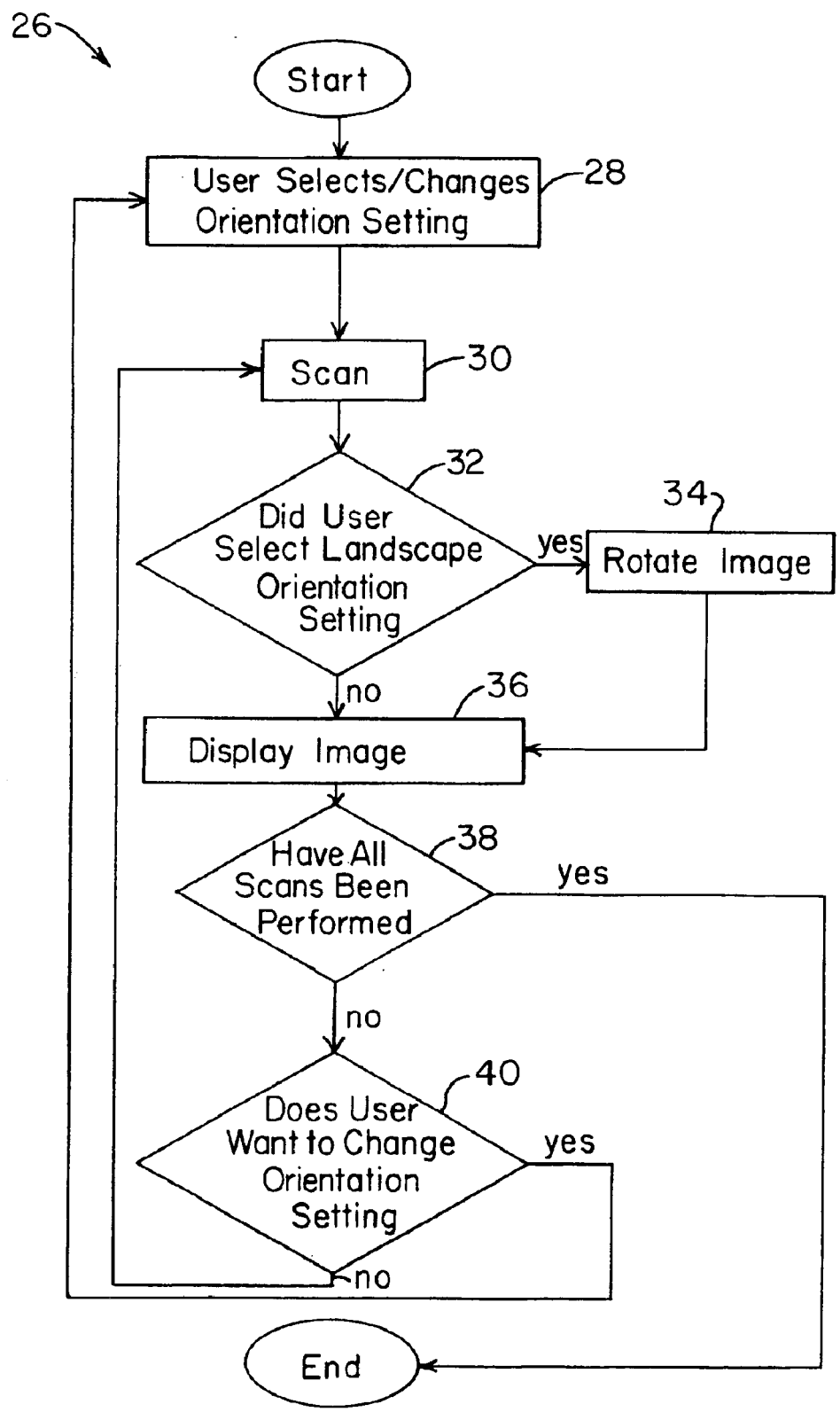
FIG. 6 is a flowchart representation of a method for controlling image display orientation according to the present invention.

The image display orientation control apparatus 10 may be operated in accordance with a method 26 illustrated in FIG. 6 to scan a series of portrait or landscape-oriented objects 5 or 5' on the portrait-oriented flatbed scanner 3, and have the resulting images 9 or 9' of the scanned objects 5 or 5' displayed on the computer display screen 11 in the appropriate orientation. In the first step 28 of method 26, the user selects or changes the orientation setting. For example, if the object to be scanned comprises a portrait-oriented object 5, the user would move the switch 20 to the first or portrait setting 12 (FIG. 2). Conversely, if the object to be scanned comprises a landscape-oriented object 5', the user would move the switch 20 to the second or portrait setting 14 (FIG. 3). In the second step 30 of method 26, the user scans the object 5 or 5' by first placing the object 5 or 5' adjacent the scanning bed 19 and then actuating the flatbed scanner 3. In the third step 32, a determination is made as to whether the user selected the landscape orientation setting 14. If so, the image is rotated in step 34. The rotated image 9' is thereafter displayed on the computer display screen 11 at step 36. However, if the user selected the first orientation setting 12, the image is not rotated. The non-rotated (i.e., portrait) image 9 is displayed on the computer display screen 11 at step 36. In the next step 38 of method 26, the user may end the process if all scans have been performed or proceed to the subsequent step 40. In step 40, the user has the option, prior to performing the next scan, of either changing the orientation setting (step 28) or continuing to scan with the same setting (step 30) since the first and second settings 12 and 14 are preserved for subsequent scans until changed by the user.

A significant advantage of the present invention is that it allows a user to select a scanning orientation (i.e., portrait or landscape) for a scanner and have that scanning orientation preserved for subsequent independent uses of the scanner. Since the scanning orientation is preserved, the need to individually rotate each scanned image when the objects being scanned have orientations that are different from that of the scanner is eliminated. Thus, the time and processing capacity needed for the user to scan a series of objects having different orientations than the underlying scanning hardware and software is minimized.

Another significant advantage of the present invention is that the it does not prevent the user from using the traditional rotation tools available in the image processing software (not shown) that may be provided on the computer system 7 to override the scanning orientation manually selected. For example, if, after viewing the resulting image of the scanned object in the selected orientation, the user wishes to have the image displayed in a different orientation, the user can manually rotate the image using the image processing software. The user would not have to change the orientation setting and scan the object again.

Having briefly described the image display orientation control apparatus 10 according to one embodiment of the present invention, as well as some of its more significant features and advantages, the various preferred embodiments of the image display orientation control apparatus will now be described in detail. However, before proceeding with the description, it should be noted that while the image display orientation control apparatus 10 is shown and described herein as it could be used in conjunction with a portrait-oriented flatbed scanner 3 and a computer system 7 having a display screen 11, the image display orientation control apparatus 10 may be used in conjunction with any of a wide range of other display devices and other optical scanner apparatus that are capable of producing two-dimensional image data of an object. For instance, the image display orientation control apparatus 10 could be used with a digital camera to print a series of portrait or landscape-oriented digital photographs on a computer printer. Consequently, the present invention should not be regarded as limited to use in conjunction with portrait-oriented flatbed scanners and computer display screens only.

With the foregoing considerations in mind, one preferred embodiment of the image display orientation control apparatus 10 according to the present invention is shown in FIGS. 2 and 3 and is described herein as it could be used in conjunction with a flatbed scanner 3 and a host computer system 7, both being of the type that are readily commercially available. The host computer system 7 may be provided with image processing software (not shown) which allows the computer system 7 to display an image 9 of the scanned object 5 on a suitable display device 11, such as CRT or LCD display. The computer system 7 may also print an image (not shown) of the object 5 on a printer (also not shown) connected to the computer system 7. Since flatbed scanners and computer systems are well-known in the art, however, and could readily be provided by persons having ordinary skill in the art after having become familiar with the teachings of the present invention, the various component parts of the flatbed scanner 3 and the computer system 7 will not be discussed in further detail herein.

The image display orientation control apparatus 10 may be operated in any one of a plurality of settings (e.g., a first setting 12 and a second setting 14) each of which causes an image of an object scanned by the flatbed scanner 3 to be displayed on a display apparatus (i.e., computer display screen 11) in a corresponding one of a plurality of orientations (e.g., a landscape orientation or a portrait orientation).

Alternatively, the image display orientation control apparatus 10 may be provided with other types of settings or additional settings. For example, besides the landscape setting (which causes the image to be rotated by 90° before being displayed), the image display orientation control apparatus 10 may be operated in any other setting which may cause the image to be rotated by any desired amount (e.g., from 0° to 360°) before being displayed. Regardless of the number of settings provided (and the corresponding amount of rotation), each of the plurality of settings is preserved for subsequent uses of the scanner 3 until changed by a user.

In one embodiment, the image display orientation control apparatus 10 may be provided with a switch 20 that is moveable between a first setting 12 (FIG. 2) and second setting 14 (FIG. 3). The first setting 12 may cause an image 9 of an object 5 scanned by the flatbed scanner 3 to be displayed on the computer display screen 11 in a first orientation 16. In the embodiment shown and described herein, the first orientation 16 is a portrait orientation, although such is not required. The first setting 12 may be preserved for subsequent uses of the flatbed scanner 3 until a user changes the setting. In other words, the first setting 12 of the image display orientation control apparatus 10 is preserved for subsequent uses of the flatbed scanner 3 when the first setting 12 is selected by the user.

Referring now to FIG. 3, the second setting 14 of the image display orientation control apparatus 10 may cause an image 9' of the object 5' to be displayed on the computer display screen 11 in a second orientation 18. In the embodiment shown and described herein, the second orientation 18 comprises a landscape orientation, although such is not required. Like the first setting 12, the second setting 14 may also be preserved for subsequent uses of the flatbed scanner 3 until the user changes the setting. Stated differently, the second setting 14 of the image display orientation control apparatus 10 is preserved for subsequent uses of the flatbed scanner 3 when the user selects the second setting 14.

As mentioned earlier, the switch 20 may be used to select between the first and second settings 12 and 14. As shown in FIGS. 2 and 3, the switch 20 may be mounted to the housing 13 of flatbed scanner 3 with the letters "P" and "L" identifying the first and second settings 12, 14, respectively. It is generally preferred, but not required, that the switch 20 be pivotally mounted to the housing 13 so that the switch 20 may be rotated between the first ("P") setting 12 and the second ("L") setting 14.

The switch 20 may comprise any of a wide range of materials (e.g., plastics, metals, etc.) and shapes suitable for the intended application. By way of example only, the switch 20 may comprise a generally flat plastic member having a rounded end and a pointed end, although such is not required.

To carry out the functionality of the image display orientation control apparatus 10, an image data processing system (not shown) may be provided that is operatively associated with the flatbed scanner 3 and the computer system 7. More specifically, and as explained in greater detail below, the image data processing system implements the functionality of the image display orientation control apparatus 10 by processing a raw image data signal (not shown) produced by the flatbed scanner 3 that is representative of the scanned object 5 or 5' in a manner that is consistent with the orientation setting of the switch 20.

As just mentioned, the flatbed scanner 3 produces a raw image data signal representative of the scanned object 5 or 5'. Since the scanning orientation for flatbed scanner 3 is oriented in portrait mode, the raw image data signal produced by the flatbed scanner 3 will initially be oriented in portrait mode. If the user selected the second or landscape setting 14, the image data processing system processes the image data signal (i.e., rotates the image) so that the computer system 7 is able to reproduce the landscape-oriented image 9' on the computer display screen 11 from the processed image data signal (FIG. 3). Alternatively, if the user selected the first or portrait setting 12, the image data processing system does not rotate the image since the image data signal produced by the portrait-oriented scanner 3 is already oriented in the portrait mode.

The image data processing system may be built into or reside in the housing 13 of flatbed scanner 3. In other words, the flatbed scanner 3 may include the image data processing system so that the processing of the raw image data signals produced by the scanning device occurs within the flatbed scanner 3. Alternatively, the image data processing functions may occur within the computer system 7 (e.g., via image data processing software operated on microprocessors contained within the computer system 7). In another alternative embodiment, the image data processing functions may be split between the flatbed scanner 3 and the computer system 7 with each performing portions of the processing functions.

The image data processing system may comprise any of a wide range of image data processing systems that are well-known in the art. Accordingly, the present invention should not be regarded as limited to any particular type of image data processing system. Moreover, since image data processing systems are well-known in the art and need not be described in detail in order to understand the present invention, the particular image data processing system utilized in one preferred embodiment of the present invention will not be described in further detail herein.

Regardless of the type of image data processing system that is utilized, if any portion of the image data processing system is built into or resides in the housing 13 of the flatbed scanner 3, it is generally desirable to provide the image data processing system with one or more communication ports (not shown) to allow data to be transferred or "downloaded" to the external computer system 7. While any of a wide range of well-known communication ports and formats may be utilized, in one preferred embodiment, the image data processing system may be provided with a universal serial bus (USB) port (not shown) and/or an infra red (IR) serial port (also not shown). The USB port and/or IR serial port may be located on the housing 13 at any convenient location.

The image display orientation control apparatus 10 may be operated in accordance with a method 26 illustrated in FIG. 6 to scan a series of portrait or landscape-oriented objects 5 or 5' on the portrait-oriented flatbed scanner 3, and have the resulting images 9 or 9' of the scanned objects 5 or 5' displayed on the computer display screen 11 in the appropriate orientation. In the first step 28 of method 26, the user selects or changes the orientation setting. For example, if the object to be scanned comprises a portrait-oriented object 5, the user would move the switch 20 to the first or portrait setting 12 (FIG. 2). Conversely, if the object to be scanned comprises a landscape-oriented object 5', the user would move the switch 20 to second or portrait setting 14 (FIG. 3). In the second step 30 of method 26, the user scans the object 5 or 5' by first placing the object 5 or 5' adjacent the scanning bed 19 and then by actuating the flatbed scanner 3 to scan the object 5 or 5'. The flatbed scanner 3 produces a raw image data signal that is representative of the scanned object 5 or 5'. Since the scanning orientation of flatbed scanner 3 is oriented in portrait mode, the raw image data signal that is received by the image data processing system will be oriented in portrait mode. In the third step 32, the image data processing system determines whether the user selected the landscape orientation setting 14. If so, the image data processing system processes the raw image data signal (e.g., by "rotating" the image data) in step 34 so that the computer system 7 will display the landscape-oriented image 9' on the computer display screen 11 at step 36. However, if the user selected the first orientation setting 12 (i.e., the portrait setting), the image data processing system does not rotate the image. Accordingly, the computer system 7 will display the portrait-oriented image 9 on the display screen 11 at step 36. In the next step 38 of method 26, the user may end the process if all scans have been performed or proceed to a subsequent step 40. In step 40, the user has the option, prior to performing the next scan, of either changing the orientation setting (by returning to step 28) or continuing to scan with the same setting (by returning to step 30) since the first and second settings 12 and 14 are preserved for subsequent scans until changed by the user.

A second embodiment 110 of the image display orientation control apparatus is illustrated in FIGS. 4 and 5. In this alternative embodiment 110, the switch 120 may be implemented as a user selectable interface 122 (e.g., icon or dialog box) that is displayed on the computer display screen 111. The user selectable interface 122 allows the user to select between the first setting 112 (FIG. 4) and the second setting 114 (FIG. 5) by simply marking the appropriate box on the computer display screen 111 with an appropriate pointing device (e.g., a mouse or a trackball, not shown) associated with the computer system 7. As before, the first and second settings 112 and 114 may each be preserved for subsequent uses of the computer system 7 and flatbed scanner 3 until changed by the user. That is, the setting 112 or 114 selected by the user will be preserved even after the computer system 7 is shut down. When the user reboots the computer system 7, the user will have the option, prior to performing a scan, of either changing the previously selected orientation setting or continuing with the setting selected before the computer system 7 was shut down.

The computer system 7 may be programmed in accordance with any of a wide range of programming methods that are now known in the art or that may be developed in the future that will allow the computer system 7 to display the user selectable interface 122. That is, a user could easily program the computer system 7 to display the user selectable interface 122 after having become familiar with the teachings of the present invention. Accordingly, the details associated with programming the computer system 7 to display the user selectable interface 122 will not be further discussed herein.

Besides, the difference in the way that the switching function is implemented in the second embodiment 110 of the invention is substantially identical to the first embodiment 10 in structure, function and operation. Accordingly, the second embodiment 110 will not be described in further detail.

It is contemplated that the inventive concepts herein described may be variously otherwise embodied and it is intended that the appended claims be construed to include alternative embodiments of the invention except insofar as limited by the prior art.

What is claimed is:

1. Image display orientation control apparatus for use with scanner apparatus and display apparatus operatively associated with the scanner apparatus, comprising:

a first setting, said first setting causing an image of an object scanned by said scanner apparatus to be displayed on said display apparatus in a first orientation, said first setting being preserved for subsequent uses of said scanner apparatus until changed by a user; and a second setting, said second setting causing said image to be displayed on said display apparatus in a second orientation, said second setting being preserved for subsequent uses of said scanner apparatus until changed by said user.

2. The image display orientation control apparatus of claim 1, wherein said first orientation comprises a portrait orientation, and wherein said second orientation comprises a landscape orientation.

3. The image display orientation control apparatus of claim 1, further comprising a switch operatively associated with said image display orientation control apparatus, said switch allowing said user to select between said first setting and said second setting.

4. The image display orientation control apparatus of claim 3, wherein said switch is mounted to said scanner apparatus.

5. The image display orientation control apparatus of claim 3, wherein said switch is implemented as a user selectable interface that is displayed on said display apparatus.

6. The image display orientation control apparatus of claim 1, further comprising an image data processing system operatively associated with said scanning apparatus and said display apparatus, said image data processing system receiving an image data signal produced by said scanner apparatus that is representative of said object, said image data processing system processing said image data signal so that said display apparatus displays the image of said object in said first orientation when said first setting is selected by said user and so that said display apparatus displays the image of said object in said second orientation when said second setting is selected by said user.

7. Image display orientation control apparatus for use with scanner apparatus and display apparatus operatively associated with the scanner apparatus, comprising a plurality of settings, each of said plurality of settings causing an image of an object scanned by said scanner apparatus to be displayed on said display apparatus in a corresponding one of a plurality of orientations, each of said plurality of settings being preserved for subsequent uses of said scanner apparatus until changed by a user.

8. Scanner apparatus, comprising:

a housing having at least one opening therein;

a scanning device mounted within said housing;

a transparent platen mounted within the at least one opening in said housing, said transparent platen allowing an object positioned adjacent said transparent platen to be scanned by said scanning device; and a switch, said switch allowing a user to select a first setting or a second setting, said first setting causing an image of said object to be displayed on a display apparatus operatively associated with said scanner apparatus in a first orientation, said second setting causing said image to be displayed on said display apparatus in a second orientation, said first setting being preserved for subsequent uses of said scanner apparatus until changed by said user, said second setting being preserved for subsequent uses of said scanner apparatus until changed by said user.

9. The scanner apparatus of claim 8, wherein said first orientation comprises a portrait orientation, and wherein said second orientation comprises a landscape orientation.

10. The scanner apparatus of claim 8, further comprising an image data processing system operatively associated with said scanning apparatus and said display apparatus, said image data processing system receiving an image data signal produced by said scanning device that is representative of said object, said image data processing system processing said image data signal so that said display apparatus displays the image of said object in said first orientation when said first setting is selected by said user and so that said display apparatus displays the image of said object in said second orientation when said second setting is selected by said user.

11. The scanner apparatus of claim 8, wherein said switch is mounted to said scanner apparatus.

12. The scanner apparatus of claim 8, wherein said switch is implemented as a user selectable interface that is displayed on said display apparatus.

13. Image display orientation control software for use with scanner apparatus and display apparatus operatively associated with the scanner apparatus, comprising:

a first setting, said first setting causing an image of an object scanned by said scanner apparatus to be displayed on said display apparatus in a first orientation, said first setting being preserved for subsequent uses of said image display orientation control software until changed by a user; and a second setting, said second setting causing said image to be displayed on said display apparatus in a second orientation, said second setting being preserved for subsequent uses of said image display orientation control software until changed by said user.

14. A scanning system, comprising:

scanner apparatus, said scanner apparatus producing an image data signal representative of an object being scanned;

display apparatus operatively associated with said scanner apparatus and responsive to the image data signal, said display apparatus displaying an image of the object; and image display orientation control apparatus operatively associated with said scanner apparatus and said display apparatus, said image display orientation control apparatus operable in a first setting and a second setting, the first setting causing said display apparatus to display the image of the object in a first orientation, the second setting causing said display apparatus to display the image of the object in a second orientation, the first and second settings of said image display orientation control apparatus being selectable by a user so that the first setting is preserved for subsequent uses of said scanner apparatus when the first setting is selected by the user and so that the second setting is preserved for subsequent uses of said scanner apparatus when the second setting is selected by the user.

15. The scanning system of claim 14, wherein said first orientation comprises a portrait orientation, and wherein said second orientation comprises a landscape orientation.

16. The scanning system of claim 14, further comprising a switch operatively associated with said image display orientation control apparatus, said switch allowing the user to select between the first setting and the second setting.

17. The scanning system of claim 14, further comprising an image data processing system operatively associated with said scanner apparatus, said display apparatus and said image display orientation control apparatus, said image data processing system receiving said image data signal produced by said scanner apparatus, said image data processing system processing said image data signal so that said display apparatus displays the image of said object in said first orientation when said first setting is selected by said user and so that said display apparatus displays the image of said object in said second orientation when said second setting is selected by said user.

18. Image display orientation control apparatus for use with scanner apparatus and display apparatus operatively associated with the scanner apparatus, comprising:

first means for causing an image of an object scanned by said scanner apparatus to be displayed on said display apparatus in a first orientation, said first means being preserved for subsequent uses of said scanner apparatus until changed by a user; and second means for causing said image to be displayed on said display apparatus in a second orientation, said second means being preserved for subsequent uses of said scanner apparatus until changed by said user.

19. A method for controlling image display orientation of scanner apparatus and display apparatus operatively associated with the scanner apparatus, comprising:

providing image display orientation control apparatus operatively associated with said scanner apparatus and said display apparatus, said image display orientation control apparatus operable in a first setting and a second setting, the first setting causing said display apparatus to display an image of an object scanned by said scanner apparatus in a first orientation, the second setting causing said display apparatus to display said image in a second orientation, the first and second settings of said image display orientation control apparatus being selectable by a user so that the first setting is preserved for subsequent uses of said scanner apparatus when the first setting is selected by the user and so that the second setting is preserved for subsequent uses of said scanner apparatus when the second setting is selected by the user;

selecting said first setting so that said display apparatus displays said image in said first orientation; or, in the alternative, selecting said second setting so that said display apparatus displays said image in said second orientation; and operating said scanner apparatus.

20. A method for controlling image display orientation of scanner apparatus and display apparatus operatively associated with the scanner apparatus, comprising:

selecting a first orientation or a second orientation, said first orientation being preserved for subsequent uses of said scanner apparatus until changed by a user, said second orientation being preserved for subsequent uses of said scanner apparatus until changed by the user;

operating said scanner apparatus to scan an object positioned adjacent a scanning bed of said scanner apparatus and to obtain an image data signal representative of said object in said first orientation;

processing said image data signal so that said display apparatus displays an image of said object in said first orientation when said first orientation is selected and so that said display apparatus displays the image of said object in said second orientation when said second orientation is selected;

displaying the image of said object in said first orientation on said display apparatus when said first orientation is selected, or in the alternative;

displaying the image of said object in said second orientation on said display apparatus when said second orientation is selected.

* * * * *